(12) United States Patent
Bottomley

(10) Patent No.: US 8,204,160 B2
(45) Date of Patent: Jun. 19, 2012

(54) METHOD AND APPARATUS FOR GENERATING SOFT BIT VALUES

(75) Inventor: Gregory E. Bottomley, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 469 days.

(21) Appl. No.: 12/572,703

(22) Filed: Oct. 2, 2009

(65) Prior Publication Data

US 2011/0075769 A1 Mar. 31, 2011

Related U.S. Application Data

(63) Continuation-in-part of application No. 12/568,036, filed on Sep. 28, 2009.

(51) Int. Cl.
*H03D 1/00* (2006.01)

(52) U.S. Cl. ............... 375/341; 375/262; 375/265

(58) Field of Classification Search .......... 375/262, 375/265, 340, 341, 260, 261
See application file for complete search history.

(56) References Cited

U.S. PATENT DOCUMENTS

| | | | |
|---|---|---|---|
| 2003/0053535 A1 | 3/2003 | Malkov et al. | |
| 2006/0146965 A1* | 7/2006 | Kwun et al. | 375/341 |
| 2006/0171483 A1* | 8/2006 | Jia et al. | 375/267 |
| 2008/0025443 A1* | 1/2008 | Lee et al. | 375/347 |
| 2008/0130775 A1* | 6/2008 | Hum et al. | 375/262 |
| 2008/0279298 A1 | 11/2008 | Ben-Yishai et al. | |
| 2008/0298491 A1* | 12/2008 | Jung et al. | 375/260 |
| 2009/0213907 A1 | 8/2009 | Bottomley et al. | |

OTHER PUBLICATIONS

Abdel-Samad A.A.: "Low-Complexity Soft-Output Reduced-State Equalization for EDGE", Wireless Communication Systems, 2007, ISWCS 2007. 4th International Symposium On, IEEE, Piscataway, NJ, USA, Oct. 1, 2007.
Bottomley, G.E.: "Block Equalization and Generalized MLSE Arbitration for the HSPA WCDMA Uplink", 2008 IEEE 68th Vehicular Technology Conference (VTC 2008-FALL) IEEE Piscataway, NJ, USA, Sep. 21-24, 2008.

* cited by examiner

*Primary Examiner* — Aristocratis Fotakis

(57) ABSTRACT

Teachings presented herein offer reduced and stable computational complexity for symbol block detection using multistage assistance, and also provide for the generation of soft bit values. A demodulator generates these soft bit values by forming from a set of candidate symbol combinations, for each group of symbols in a symbol block, a subset of candidate symbol combinations for that group. The demodulator selects from the set the most likely combination, at least one combination that has a complementary bit value for a respective bit value in the most likely combination, and as many of the next most likely combinations not already selected as are needed for the size of the subset to conform to a pre-determined size. The demodulator generates soft bit values by limiting the candidate combinations of symbols considered for a symbol block according to the subsets formed for the groups of symbols in that symbol block.

18 Claims, 9 Drawing Sheets

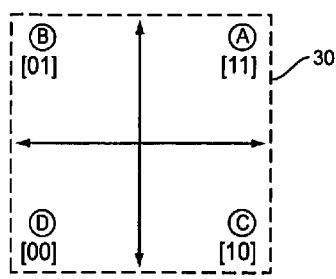
FIG. 3A
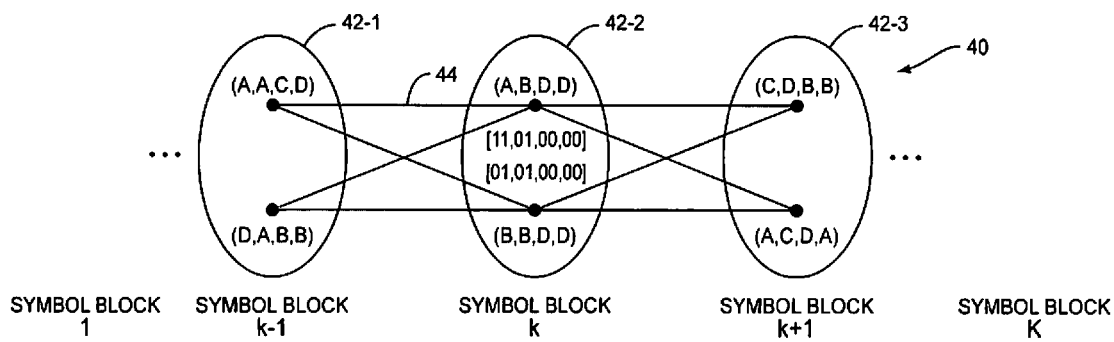
FIG. 3B
FIG. 3C
*(PRIOR ART)*

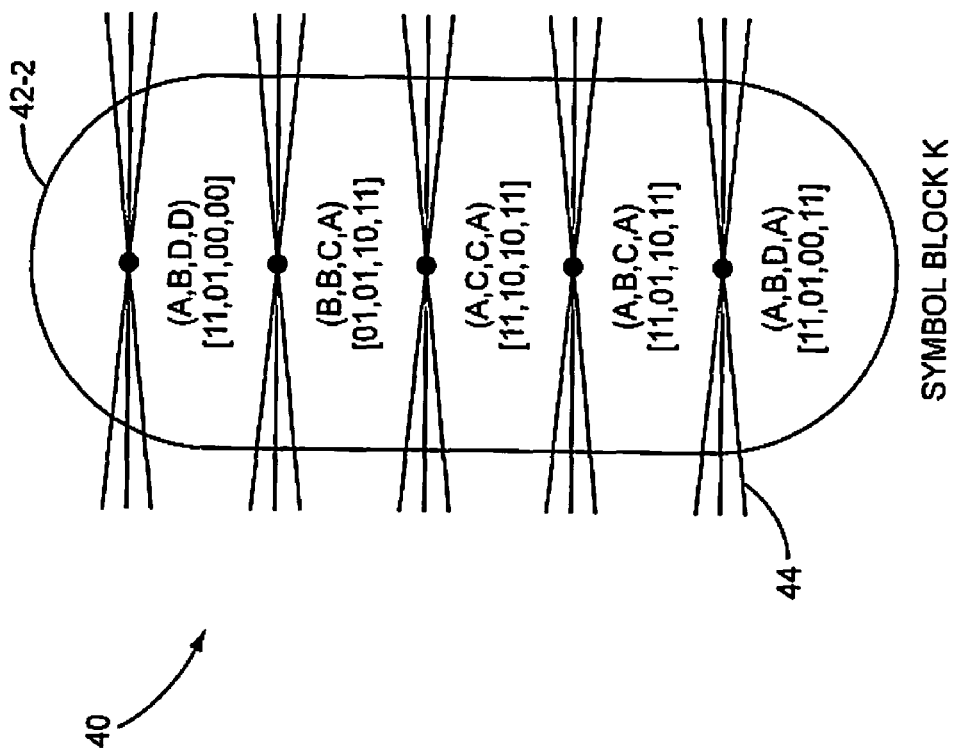

METHOD AND APPARATUS FOR GENERATING SOFT BIT VALUES

RELATED APPLICATIONS

This is a continuation-in-part of U.S. patent application Ser. No. 12/568,036, filed Sep. 28, 2009, the entire disclosure of which is incorporated by reference.

TECHNICAL FIELD

The present invention relates generally to symbol block detection, and particularly to generating soft bit values for symbol blocks detected using multi-stage assistance.

BACKGROUND

In Direct Sequence Code Division Multiple Access (DS-CDMA) systems, a receiver may be assigned to receive multiple symbol sequences sent in parallel using different orthogonal codes. When a sequence of symbol blocks is received over a dispersive channel, however, orthogonality between codes is destroyed and intersymbol interference (ISI) results between time-successive symbol blocks and between the symbols within each symbol block. ISI may also be caused in other systems, such as those based on Multiple-Input Multiple-Output (MIMO) transmission where non-orthogonal symbol sequences are sent in parallel from different antennas. In all cases, some form of interference suppression or equalization is needed.

One approach to equalization employing maximum likelihood detection (MLD) would hypothesize all $M^N$ possible combinations of symbols in each symbol block and form metrics to determine the most likely symbol combination, where M is the number of possible values each symbol may take and N is the number of symbols in each symbol block. However, even for blocks of three 16-QAM symbols in the HSPA uplink, the $16^3 = 4096$ possible symbol combinations for each symbol block renders such an approach impractical, as the state-size and number of metrics to compute would be prohibitively large.

Another approach referred to as Assisted Maximum Likelihood Detection (AMLD) with Multi-Stage Assistance (MSA) reduces computational complexity. See the parent application hereto, U.S. patent application Ser. No. 12/568,036. In one embodiment of AMLD with MSA, for example, two or more stages of detection assistance are performed in succession by jointly detecting progressively larger groups of symbols in a symbol block across the stages of detection assistance. As a result, the two or more stages of detection assistance identify a final reduced set of candidate symbol combinations that is reduced as compared to the defined set of all possible symbol combinations. A detector then detects a symbol block using a joint detection process that limits the candidate combinations of symbols considered for the symbol block to the final reduced set of candidate symbol combinations identified for that symbol block.

In limiting the candidate combinations of symbols that must be considered by the detector to the final reduced set identified for each symbol block, the stages of detection assistance greatly reduce the computational complexity of the detector. Moreover, the computational complexity of AMLD with MSA remains mostly stable over the detection of different symbol blocks, provided that the size of the final reduced sets identified for those symbol blocks doesn't significantly vary.

By only considering the final reduced set identified for a symbol block, however, the detector can produce insufficient reliability, or soft, information about the bits detected. In fact, some of the candidate symbol combinations needed by the detector to generate this soft information (e.g., the combinations corresponding to one or more bit values complementary to those detected) may be missing entirely from the final reduced set. Additional processing could be performed to determine the missing candidate symbol combinations and append as many of them to the final reduced set as needed for the detected bit values to have complementary bit values. See, e.g., U.S. patent application Ser. No. 12/510,537, filed Jul. 28, 2009, the entire disclosure of which is incorporated by reference. However, the additional processing required for such an approach would threaten to significantly increase the computational complexity of AMLD with MSA, and the variable size of the final reduced set would likely jeopardize the stability of that computational complexity.

SUMMARY

Teachings presented herein offer reduced and stable computational complexity for symbol block detection using multi-stage assistance, and also provide for the generation of soft information about the bits detected. According to these teachings, one or more stages of detection assistance identify a reduced set of candidate symbol combinations for a symbol block, and a final stage of detection assistance determines a final reduced set. This final reduced set includes certain candidate symbol combinations useful for detecting and generating soft bit values for the symbol block, and also has a size that conforms to a pre-determined size so the computational complexity of detection remains stable.

More particularly, a demodulator as taught herein is configured to generate soft bit values for a plurality of symbol blocks. To do so, the demodulator includes one or more assisting detectors, a final assisting detector, and a detector.

At least one of the assisting detectors, the final assisting detector, or both is configured to form from a set of candidate symbol combinations, for each of one or more groups of symbols in a symbol block, a subset of candidate symbol combinations for that group. In one embodiment, for example, the final assisting detector is configured to form from the reduced set of candidate symbol combinations identified for a symbol block (i.e., which is one group of all symbols in a symbol block) a final reduced set of candidate symbol combinations for that symbol block (that is, the final reduced set is a subset of the reduced set). In other embodiments, the one or more assisting detectors are configured to form from a set of candidate symbol combinations, for each of one or more groups of symbols in a symbol block, a subset of candidate symbol combinations for that group, where each group contains less than all of the symbols in that symbol block.

Regardless, the assisting detector, the final assisting detector, or both forms a subset by selecting from the set of candidate symbol combinations for that group the most likely candidate symbol combination in the set. The assisting detector, the final assisting detector, or both also selects at least one candidate symbol combination which is the most likely in the set that has a complementary bit value for a respective bit value in the most likely candidate symbol combination. Finally, the assisting detector, the final assisting detector, or both selects as many of the next most likely candidate symbol combinations not already selected as are needed for the size of the subset to conform to a pre-determined size.

Because the size of the subset formed at one stage of detection assistance conforms to a pre-determined size, the computational complexity of later stages of detection assistance (or the computational complexity of the detector itself) remains stable over the detection of the symbol blocks. Moreover, because the subset includes candidate symbol combinations that have bit values complementary to those of the candidate symbol combination most likely to be detected, the final reduced set identified by the stages of detection assistance will likewise include such complementary bit values. Accordingly, the detector can generate soft bit values for the plurality of symbol blocks while also limiting the candidate combinations of symbols considered for a symbol block to the final reduced set identified for that symbol block.

In some embodiments, the demodulator guarantees that the subset formed will include complementary bit values for all bit values in the most likely candidate symbol combination. In one embodiment, for example, the demodulator first arranges all candidate symbol combinations in the set in order of likelihood and then progresses through the arranged set in decreasing order of likelihood to select for inclusion in the subset certain combinations. In an alternative embodiment, the demodulator first determines the candidate symbol combinations in the set that have complementary bit values for a particular bit value in the most likely candidate symbol combination and then arranges only those combinations in order of likelihood to select for inclusion in the subset certain combinations (this is performed for each bit value in the most likely candidate symbol combination).

In other embodiments, the demodulator does not guarantee that the subset formed will include complementary bit values for all bit values in the most likely candidate symbol combination, but notably has reduced computational complexity. In one such embodiment, the demodulator arranges only a portion of the candidate symbol combinations in the set in order of likelihood and then progresses through only those arranged candidate symbol combinations to select for inclusion in the subset certain combinations. Soft bit value generation for those bit values that do not have complementary bit values may be performed using other known approaches, such as those described in U.S. patent application Ser. No. 12/510,537.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3A is a diagram of a defined set of candidate symbol values for a symbol within an example QPSK constellation.

FIG. 3B is a diagram of a defined set of candidate symbol combinations for an example symbol block comprising a combination of four QPSK symbols.

FIG. 3C is a diagram of example state spaces in a trellis for prior reduced complexity symbol block detection.

FIG. 5B is a diagram of example state spaces in a trellis for reduced complexity symbol block detection as taught according to another embodiment of the present invention.

DETAILED DESCRIPTION

Figure 1:
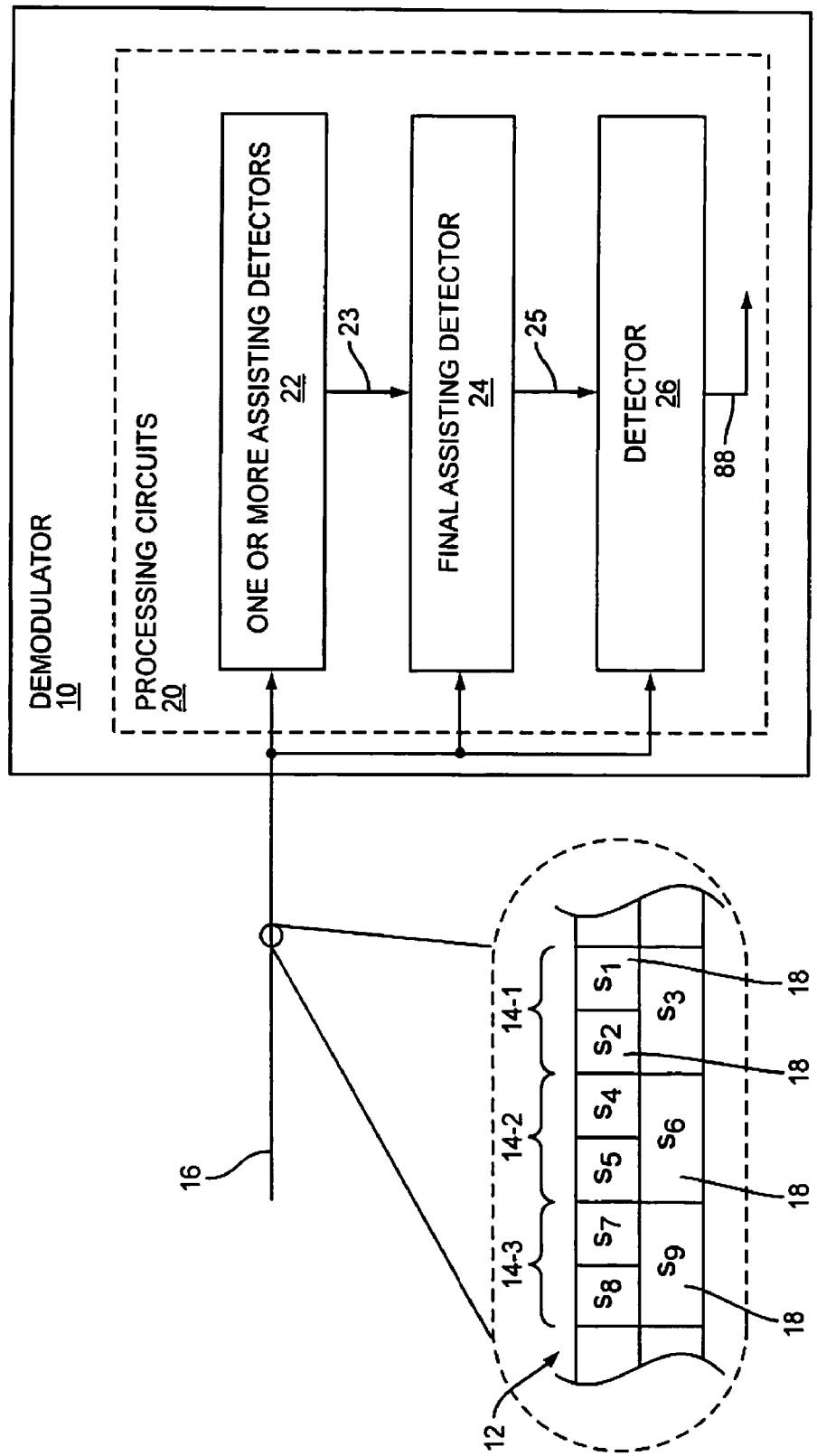
FIG. 1 is a block diagram of a demodulator according to one embodiment of the present invention.

FIG. 1 illustrates one embodiment of a demodulator 10 configured to detect a time sequence 12 of symbol blocks 14 logically conveyed by a received signal 16. Each symbol block 14 comprises a combination of N symbols 18, where $N \geq 2$. As shown in FIG. 1, for example, one symbol block 14-1 comprises the combination of three symbols 18 denoted as s1, s2, and s3, while another symbol block 14-2 comprises the combination of three other symbols 18 denoted as s4, s5, and s6. Each symbol 18 may have any one of M possible values (also referred to herein as "candidate symbol values"), the set of which is defined by the modulation constellation used to form the symbols 18 for transmission.

With M possible values for each of N symbols 18 in a symbol block 14, each symbol block 14 may comprise any symbol combination within a defined set of $M^N$ possible symbol combinations (also referred to herein as "candidate symbol combinations"). To determine the symbol combination represented by each symbol block 14, and thereby detect the sequence 12 of symbol blocks 14, the demodulator 10 comprises one or more processing circuits 20. The one or more processing circuits 20 include one or more assisting detectors 22, a final assisting detector 24, and a detector 26.

The one or more assisting detectors 22 collectively identify from the defined set of $M^N$ candidate symbol combinations for a symbol block 14 a reduced set 23 of $R_a$ candidate symbol combinations, where $R_a < M^N$. The final assisting detector 24 then determines from this reduced set 23 a final reduced set 25 of $R_f$ candidate symbol combinations for that symbol block 14, where $R_f < R_a$.

The detector 26 actually determines the most likely symbol combination corresponding to each of the symbol blocks 14. Instead of considering all $M^N$ candidate symbol combinations in the defined set, however, the detector 26 limits the candidate combinations of symbols 18 considered for a symbol block 14 to the final reduced set 25 of $R_f$ candidate symbol combinations determined for that symbol block 14. In limiting the candidate combinations of symbols 18 considered by the detector 26 to those in the final reduced set 25, the one or more assisting detectors 22 and the final assisting detector 24 (referred to generally as 'the assisting detectors 22, 24') greatly reduce the complexity of symbol block detection performed by the detector 26.

Notably, however, the assisting detectors 22, 24 determine the final reduced set 25 of candidate symbol combinations for a symbol block 14 to also facilitate generation of soft bit values 88 by the detector 26. (Each soft bit value 88 is associated with a particular bit in a detected symbol block and, in general, indicates the likelihood that the bit has one value over another.) To facilitate generation of these soft bit values 88, the assisting detectors 22, 24 determine the final reduced set 25 so that it includes candidate symbol combinations corresponding to one or more bit values that are complementary to those most likely to be detected. In addition, to ensure that the computational complexity of the detector 26 remains stable over the detection of different symbol blocks 14, the assisting detectors 22, 24 determine the final reduced set 25 so that its size conforms to a pre-determined size.

Figure 2:
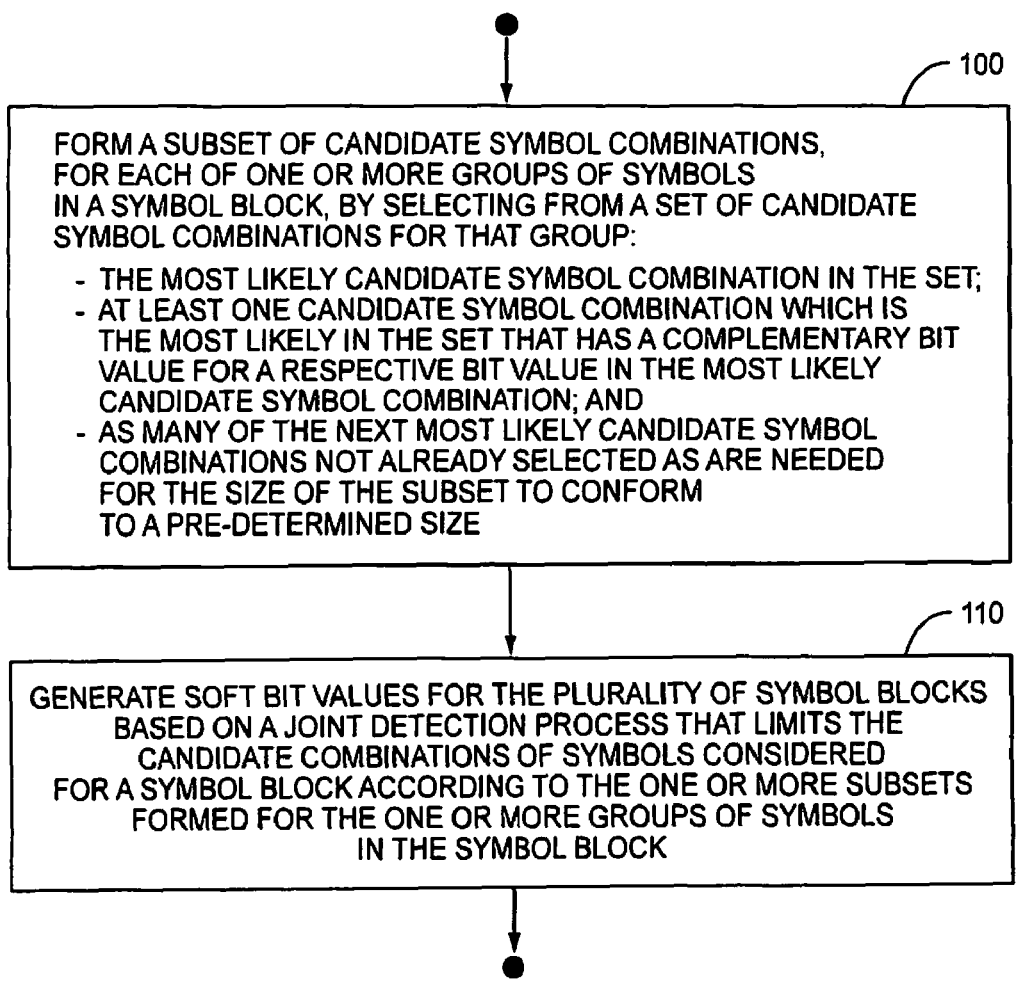
FIG. 2 is a logic flow diagram illustrating one embodiment of a method for generating soft bit values for a plurality of symbol blocks according to the present invention.

More particularly, the demodulator 10 implements the method illustrated in FIG. 2 to generate soft bit values 88. According to FIG. 2, at least one of the assisting detectors 22, 24 is configured to form from a set of candidate symbol combinations, for each of one or more groups of symbols 18 in a symbol block 14, a subset of candidate symbol combinations for that group (Step 100). To do so, the assisting detector 22, 24 forms the subset by selecting from the set of candidate symbol combinations for that group the most likely candidate symbol combination in the set. The assisting detector 22, 24 also selects at least one candidate symbol combination which is the most likely in the set that has a complementary bit value for a respective bit value in the most likely candidate symbol combination. Finally, the assisting detector 22, 24 selects as many of the next most likely candidate symbol combinations not already selected as are needed for the size of the subset to conform to a pre-determined size. The detector 26 then generates soft bit values 88 for the plurality of symbol blocks 14 based on a joint detection process that limits the candidate combinations of symbols considered for a symbol block 14 according to the one or more subsets formed for the one or more groups of symbols 18 in that symbol block 14 (Step 110). Soft bit value generation can be performed using one of several known techniques, such as the Soft Output Viterbi Algorithm (SOVA) developed by Hagenauer and Hoeher. See, e.g., "A Viterbi Algorithm with Soft Decision Outputs and its Applications", Proceedings of Globecom, 1989, pp. 1680-1686.

In one embodiment, for example, the final assisting detector 24 is configured to determine the final reduced set 25 of candidate symbol combinations for a symbol block 14 according to the method in FIG. 2; that is, by forming the final reduced set 25 of candidate symbol combinations for the symbol block 14 as a subset of the reduced set 23 identified for that symbol block 14. To do so, the final assisting detector 24 selects from the reduced set 23 identified for the symbol block 14 the most likely candidate symbol combination in the reduced set 23. The final assisting detector 24 then selects at least one candidate symbol combination which is the most likely in the reduced set 23 that has a complementary bit value for a respective bit value in the most likely candidate symbol combination. Lastly, the final assisting detector 24 selects as many of the next most likely candidate symbol combinations not already selected as are needed for the size of the final reduced set 25 to conform to a pre-determined size. The detector 26 then generates soft bit values 88 for the plurality of symbol blocks 14 based on a joint detection process that limits the candidate combinations of symbols considered for a symbol block 14 according to the final reduced set 25 identified for that symbol block 14.

The final assisting detector 24 in the above described embodiment was configured to form a subset of candidate symbol combinations for an entire symbol block 14 (i.e., the final reduced set 25 was a subset of candidate symbol combinations for one group of all symbols in a symbol block 14). In other embodiments, however, the final assisting detector 24 may be configured to form a subset of candidate symbol combinations for each of one or more groups of symbols 18 in a symbol block 14, where each group contains less than all of the symbols 18 in that symbol block 14. In still other embodiments, one or more of the assisting detectors 22 may be configured to form such subsets instead of, or in addition to, the final assisting detector 24.

Regardless, forming a subset of candidate symbol combinations for a group of symbols 18 based on the likelihood of the candidate symbol combinations in the set from which they are selected may entail one or more sorting operations. For instance, in one embodiment, the assisting detector 22, 24 forming the subset is configured to jointly detect the symbols 18 in the group to obtain joint metrics for the candidate symbol combinations in the set. The joint metric for a candidate symbol combination may indicate the likelihood of that candidate symbol combination, for example. The assisting detector 22, 24 then performs one or more sorting operations on the set (e.g., bubble sort or insertion sort) as a function of the joint metrics obtained. Such sorting operations may enable the assisting detector 22, 24 to determine the candidate symbol combination in the set that has a joint metric indicating it is the most likely candidate symbol combination in the set, the candidate symbol combination in the set that has a joint metric indicating it is the next most likely, and so on. The assisting detector 22, 24, therefore, selects candidate symbol combinations from the set (i.e., the most likely one, the most likely one that has a complementary bit value, etc.) responsive to the sorting operations.

With the above points of variation and implementation of the demodulator 10 in mind, it is helpful to consider soft bit value generation for an example sequence of K symbol blocks. As shown in FIG. 3A, each symbol block in this example comprises four QPSK symbols with Gray coding (i.e., N=4, M=4). That is, each QPSK symbol may have any one of four possible symbol values: 1+j (labeled as 'A' for illustrative purposes), −1+j ('B'), 1−j ('C'), and −1−j ('D'). Each of these symbol values encodes two bits, where the symbol value A corresponds to the bits [11], symbol value B corresponds to the bits [01], symbol value C corresponds to the bits [10], and symbol value D corresponds to the bits [00]. The four possible symbol values comprise a defined set 30 of M=4 candidate symbol values for each QPSK symbol. With M=4 candidate symbol values for each of N=4 symbols in a symbol block, each symbol block may comprise any symbol combination within a defined set 32 of $M^N=4^4=256$ candidate symbol combinations, as shown in FIG. 3B.

FIG. 3C illustrates an example trellis 40 for detecting the sequence of K symbol blocks using prior approaches to AMLD with MSA. In this example, the sequence of K symbol blocks are represented in the trellis 40 by a sequence of state spaces 42-1, 42-2, and 42-3. Each state space 42 includes a final reduced set of only two candidate symbol combinations identified for the corresponding symbol block, as compared to the defined set of $M^N=4^4=256$ candidate symbol combinations. The state space 42-2 for symbol block k, for example, is constrained to the final reduced set of two candidate symbol combinations; namely (A,B,D,D) and (B,B,D,D). A particular set of branches 44 interconnecting the candidate symbol combinations through the overall sequence of state spaces 42 represents a particular symbol block sequence. The set of branches 44 interconnecting the most likely sequence of candidate symbol combinations is identified by a detector, which in FIG. 3C considers only a reduced number of possible symbol block sequences because of the reduced size of each state space 42. This reduces computational complexity, but, notably, compromises soft bit value generation.

Take, for instance, soft bit value generation for the second bit $b_2$ in symbol block k of the example sequence, where a symbol block corresponds to the bits $[b_1b_2,b_3b_4,b_5b_6,b_7b_8]$. Assume for this example that the detector detects symbol block k as having the candidate symbol combination (A,B,D, D), which corresponds to the bit values [11,01,00,00] according to the symbol alphabet in FIG. 3A. To generate soft bit value information for the second bit detected $b_2=1$ in symbol block k, the detector must compare the error resulting from that detection with the error that would have resulted had it detected symbol block k as having a different candidate symbol combination; namely one that has a bit value for $b_2$ that is complementary to that of the detected candidate symbol combination (A,B,D,D) (i.e., $b_2=0$). Due to the reduced state space 42-2 for symbol block k, however, no such candidate symbol combination exists. Rather, the only other candidate symbol combination in the state space 42-2, (B,B,D,D), has a bit value for $b_2$ that matches that of (A,B,D,D). (Specifically, $b_2=1$ for both (A,B,D,D) and (B,B,D,D), which corresponds to the bit values [01,01,00,00]). The same difficulty in soft bit value generation occurs for all bit values of symbol block k except $b_1$.

In one embodiment, however, the assisting detectors 22, 24 contemplated herein guarantee that the final reduced set determined for a symbol block (and thereby any state space used by the detector 26 for that symbol block) includes candidate symbol combinations that collectively have complementary bit values $\bar{b}_1,\bar{b}_2,\bar{b}_3,\bar{b}_4,\bar{b}_5,\bar{b}_6,\bar{b}_7,\bar{b}_8$ for every bit value $b_1,b_2,b_3,b_4,b_5,b_6,b_7,b_8$ in the detected candidate symbol combination. This enables the detector 26 to generate soft bit values 88 for every detected bit value. Moreover, the assisting detectors 22, 24 guarantee that the size of the final reduced set 25 conforms to a pre-determined size, ensuring that the computational complexity of the detector 26 remains stable over the detection of different symbol blocks 14.

Figure 4A:
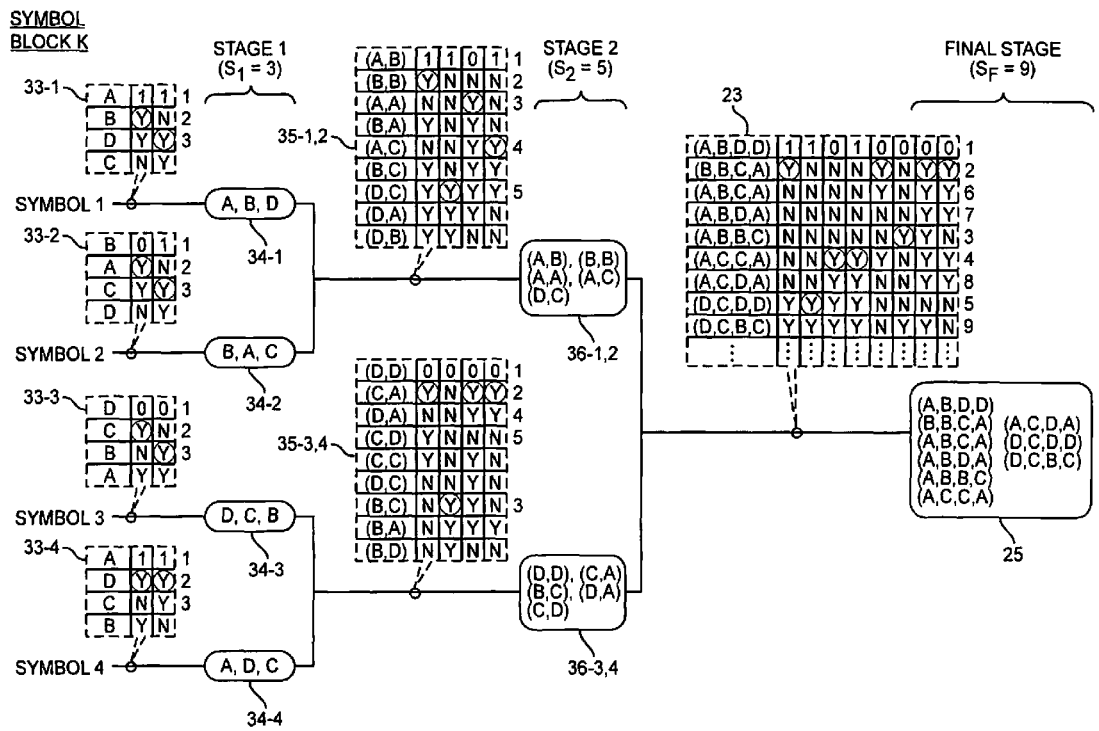
FIG. 4A is a diagram illustrating symbol block detection and soft bit value generation for an example symbol block according to one embodiment of the present invention.

FIG. 4A illustrates one example of this embodiment with respect to symbol block k discussed above in FIGS. 3A-3C. In this example, a first assisting detector 22 performs a first stage of detection assistance and a second assisting detector 22 performs a second stage of detection assistance. Collectively, the two assisting detectors 22 identify from the defined set 32 of $M^N=4^4=256$ candidate symbol combinations a reduced set 23 of $R_a=25$ candidate symbol combinations for symbol block k. The final assisting detector 24 then performs the final stage of detection assistance to form from this reduced set 23 a final reduced set 25 of only $R_f=9$ candidate symbol combinations for symbol block k.

More particularly, the first assisting detector 22 performing stage one detects each of the four individual symbols within the symbol block k, to form from the defined set 30 of M=4 candidate symbol values a reduced set 34 of $S_1=3$ candidate symbol values for each symbol. With regard to symbol 1, for example, the first assisting detector 22 forms the reduced set 34-1 as including the candidate symbol values A, B, and D. With regard to symbol 2, the first assisting detector 22 forms the reduced set 34-2 as including the candidate symbol values B, A, and C. Having formed the reduced sets 34-1 and 34-2, the first assisting detector 22 thereby identifies a set 35-1,2, which includes the $3^2=9$ combinations of symbols 1 and 2 that are possible when the value of symbols 1 and 2 are limited to the $S_1=3$ candidate symbol values in the reduced sets 34-1 and 34-2, respectively. These include, for instance, (A,B), (B,B), (A,A), (B,A), (A,C), (B,C), (D,C), (D,A), and (D,B). Likewise, the first assisting detectors forms the reduced sets 34-3 and 34-4, to thereby identify the set 35-3,4 of $3^2=9$ combinations of symbols 3 and 4 that are possible when the value of symbols 3 and 4 are limited to the $S_1=3$ candidate symbol values in the reduced sets 34-3, and 34-4, respectively.

The second assisting detector 22 is configured to form from the set 35-1,2 of $3^2=9$ candidate symbol combinations identified for the group of symbols 1 and 2 a subset 36-1,2 of only $S_2=5$ candidate symbol combinations for that group. In the same manner, the second assisting detector 22 is configured to form from the set 35-3,4 of $3^2=9$ candidate symbol combinations identified for the group of symbols 3 and 4 a subset 36-3,4 of only $S_2=5$ candidate symbol combinations for that group. To form these subsets, the second assisting detector 22 in this example performs the steps illustrated in FIG. 4B for each group of symbols.

To form the subset 36-1,2, the second assisting detector 22 performs one or more sorting operations on the set 35-1,2 to arrange all of the candidate symbol combinations in that set in order of likelihood (Step 200). This may be done, for example, by obtaining joint metrics for each candidate symbol combination in the set 35-1,2 and sorting the candidate symbol combinations according to the joint metrics obtained. Assuming for instance that the set 35-1,2 in FIG. 4A is arranged in decreasing order of likelihood, the candidate symbol combination (A,B) is the most likely in the set 35-1,2, the candidate symbol combination (B,B) is the next most likely, (A,A) the next, and so on.

Having arranged all of the candidate symbol combinations in the set 35-1,2, the second assisting detector 22 progresses through them in decreasing order of likelihood. The second assisting detector 22 first selects for inclusion in the subset 36-1,2 the most likely candidate symbol combination in the set 35-1,2, namely (A,B) (Step 210). (The order of selection for inclusion in the subset 36-1,2 is indicated by the number to the right of each combination in the set 35-1,2 in FIG. 4A; the number '1' to the right of (A,B), for example, indicates that the second assisting detector 22 first selects the combination (A,B) for inclusion in the subset 36-1,2).

The second assisting detector 22 then determines whether the next most likely candidate symbol combination in the set 35-1,2, namely (B,B), has a complementary bit value for a respective bit value in (A,B), the most likely candidate symbol combination (Step 220). Because the candidate symbol combination (A,B) has bit values [11,01] and because the candidate symbol combination (B,B) has bit values [01,01], the second assisting detector 22 determines that (B,B) has a complementary bit value for the first bit value in (A,B), but not for the second, third, or fourth bit values (as indicated in FIG. 4A by the 'Y' under the first bit value, and by the 'N' under the second, third, and fourth bit values).

Before including (B,B) in the subset 36-1,2, however, the second assisting detector 22 first determines whether any other candidate symbol combination already selected has a complementary bit value for the first bit value in (A,B) (Step 230). Of course, no other candidate symbol combinations beside (A,B) have been selected at this point in the example, and therefore, no other candidate symbol combination in the subset 36-1,2 has such a complementary bit value (as indicated in FIG. 4A by the circle around the 'Y' under the first bit value for (B,B)). Accordingly, the second assisting detector 22 selects the candidate symbol combination (B,B) as the second combination to include in the subset 36-1,2 (Step 240).

In one embodiment, the second assisting detector 22 makes the determinations at Steps 220 and 230 by maintaining a bit pattern for each symbol (e.g., by maintaining the bit pattern

[11] for 'A,' [01] for 'B,' [10] for 'C,' and [00] for 'D'). The second assisting detector 22 then creates the bit pattern for each candidate symbol combination in the set 35-1,2 by concatenating the bit patterns of the individual symbols in that candidate symbol combination (e.g., the second assisting detector 22 creates the bit pattern for (A,B) by concatenating the bit pattern for 'A,' [11], with the bit pattern for 'B,' [01]). Next, the second assisting detector 22 determines a complementary bit pattern for each candidate symbol combination in the set 35-1,2, relative to the most likely candidate symbol combination, by 'XORing' the bit pattern of each candidate symbol combination with that of the most likely candidate symbol combination (e.g., the second assisting detector 22 determines the complementary bit pattern for (B,B) by 'XORing' the bit pattern for (B,B), [01,01], with that of (A,B), [11,01], resulting in the complementary bit pattern [10,00] which indicates (B,B) has a complementary bit value for the first bit value in (A,B), but not for the second, third, or fourth bit values). In addition, the second assisting detector 22 maintains an accumulated complementary bit pattern for the subset 36-1,2 by 'ORing' the complementary bit patterns of all candidate symbol combinations selected for inclusion in the subset 36-1,2. The current accumulated complementary bit pattern for the subset 36-1,2, therefore, indicates the bit values for which the candidate symbol combinations currently in the subset 36-1,2 have complementary bit values relative to the most likely candidate symbol combination.

Accordingly, to determine whether the next most likely candidate symbol combination should be selected for inclusion in the subset 36-1,2, the second assisting detector 22 determines a prospective accumulated complementary bit pattern, which would be the accumulated complementary bit pattern if that combination were in fact to be selected (e.g., by ORing the current accumulated complementary bit pattern with the complementary bit pattern of the next most likely candidate symbol combination). The second assisting detector 22 then determines if the prospective accumulated complementary bit pattern indicates that the next most likely candidate symbol combination would increase the number of complementary bit values in the subset 36-1,2 relative to the most likely candidate symbol combination (e.g., by XORing the prospective accumulated complementary bit pattern with the current accumulated complementary bit pattern, and then ORing the result. If so, the second assisting detector 22 selects it for inclusion in the subset 36-1,2.

Figure 4B:
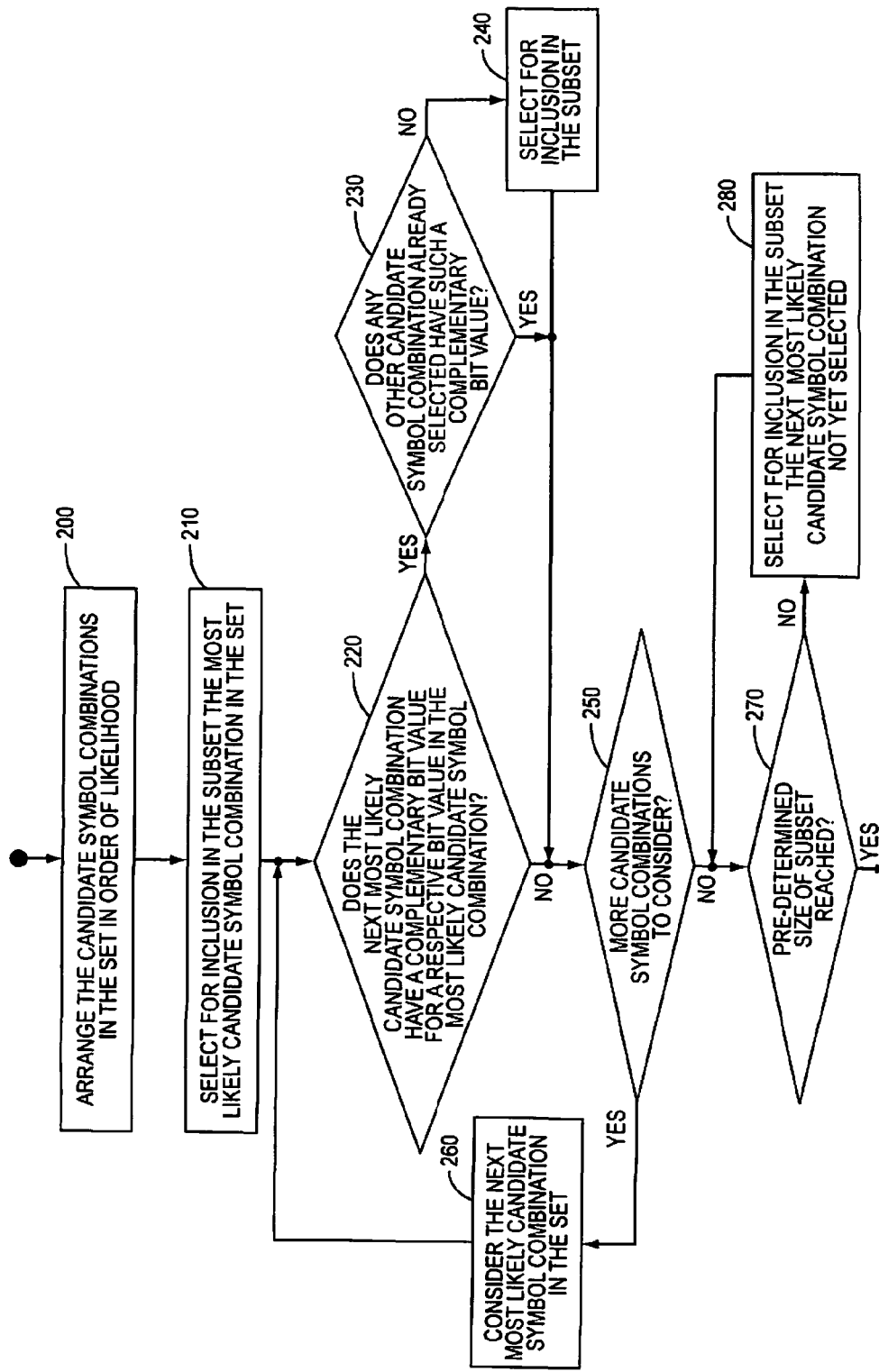
FIG. 4B is a logic flow diagram illustrating one embodiment for forming a subset of candidate symbol combinations for a group of symbols according to the present invention.

Continuing the example with respect to FIG. 4B, the second assisting detector 22 thereafter determines whether there are more candidate symbol combinations in the set 35-1,2 to consider for inclusion in the subset 36-1,2 (Step 250). Because there are more to consider at this point in the example, the second assisting detector 22 considers (A,A), the next most likely candidate symbol combination in the set 35-1,2, (Step 260), and repeats the above described process with respect to (A,A).

As seen in FIG. 4A, (A,A) does have a complementary bit value for the third bit value in (A,B) (YES at Step 220) and no other candidate symbol combination already selected in the subset 36-1,2 has a complementary bit value for the third bit value in (A,B) (NO at Step 230). Accordingly, the second assisting detector 22 selects (A,A) as the third combination to include in the subset 36-1,2 (Step 240) and then considers (B,A) as the next most likely candidate symbol combination in the set 35-1,2.

However, although (B,A) does have complementary bit values for both the first and third bit values in (A,B), other candidate symbol combinations already selected for inclusion in the subset 36-1,2 have those complementary bit values. Specifically, (B,B) has a complementary bit value for the first bit value in (A,B), and (A,A) has a complementary bit value for the third bit value in (A,B). Accordingly, the second assisting detector 22 does not select (B,A) for inclusion in the subset 36-1,2, even though it is more likely than the candidate symbol combinations remaining in the set 35-1,2.

The second assisting detector 22 continues to progress through the set 35-1,2 as described above, (i) selecting (A,C) as the fourth combination to include in the subset 36-1,2 because it has a complementary bit value for the fourth bit value in (A,B); (ii) not selecting (B,C) because other candidate symbol combinations already selected have complementary bit values for the first, third, and fourth bit values; (iii) selecting (D,C) as the fifth combination because it has a complementary bit value for the second bit value in (A,B); and (iv) not selecting any of the remaining candidate symbol combinations because all bit values in (A,B) have complementary bit values in the subset 36-1,2.

After the second assisting detector 22 has considered all candidate symbol combinations in the set 35-1,2 (NO from Step 250), the second assisting detector 22 determines whether the size of the subset 36-1,2 conforms to the pre-determined size, $S_2=5$ (Step 270). Because the second assisting detector 22 has selected five candidate symbol combinations for inclusion in the subset 36-1,2 the size of the subset 36-1,2 does conform to the pre-determined size, $S_2=5$ (YES at Step 270). Accordingly, the second assisting detector 22 need not select any more candidate symbol combinations for inclusion in the subset 36-1,2.

To form the subset 36-3,4, however, the second assisting detector 22 does select more candidate symbol combinations for inclusion in the subset 36-3,4 in order that the size of the subset conforms to the pre-determined size, $S_2=5$. Specifically, the second assisting detector 22 identifies as most likely and first selects for inclusion in the subset 36-3,4 the candidate symbol combination (D,D). The second assisting detector 22 then selects (C,A) as the second combination to include in the subset 36-3,4 because it has complementary bit values for the first, third, and fourth bit values in (D,D). Progressing through the set 35-3,4 in decreasing order of likelihood, the second assisting detector 22 doesn't select another candidate symbol combination until considering (B,C), which has a complementary bit value for the second bit value in (D,D). Since the subset 36-3,4 only includes three candidate symbol combinations at this point, the second assisting detector 22 determines that the size of the subset 36-3,4 does not conform to the pre-determined size, $S_2=5$ (NO at Step 270). Accordingly, the second assisting detector 22 selects for inclusion in the subset 36-3,4 the next most likely candidate symbol combination not yet selected; namely (D,A). Furthermore, because the size of the subset 36-3,4 still does not conform to the pre-determined size even after selecting (D,A), (another NO from Step 270), the second assisting detector 22 also selects (C,D) for inclusion in the subset 36-3,4 as the next most likely candidate symbol combination not yet selected.

Having formed the subsets 36-1,2 and 36-3,4, the second assisting detector 22 thereby identifies the reduced set 23 of $R_a=25$ candidate symbol combinations for symbol block k, as the set of combinations of symbols 1, 2, 3, and 4 that are possible when (i) the candidate combinations of symbols 1 and 2 are limited to the $S_2=5$ candidate symbol combinations in the subsets 36-1,2; and (ii) the candidate combinations of symbols 3 and 4 are limited to the $S_2=5$ candidate symbol combinations in the subsets 36-3,4. The final assisting detector 24 is configured to determine from this reduced set 23 of $R_a=25$ candidate symbol combinations a final reduced set 25 of $S_F=9$ candidate symbol combinations, by forming the final reduced set 25 as a subset of the reduced set 23 according to the method described above with respect to FIG. 4B (i.e., with the set being the reduced set 23, and the subset being the final reduced set 25 with a pre-determined size of $S_F=9$). In doing so, the final assisting detector 24 forms the final reduced set 25 so that it includes candidate symbol combinations that collectively have complementary bit values for every bit value in the candidate symbol combination most likely to be detected.

Figure 4C:
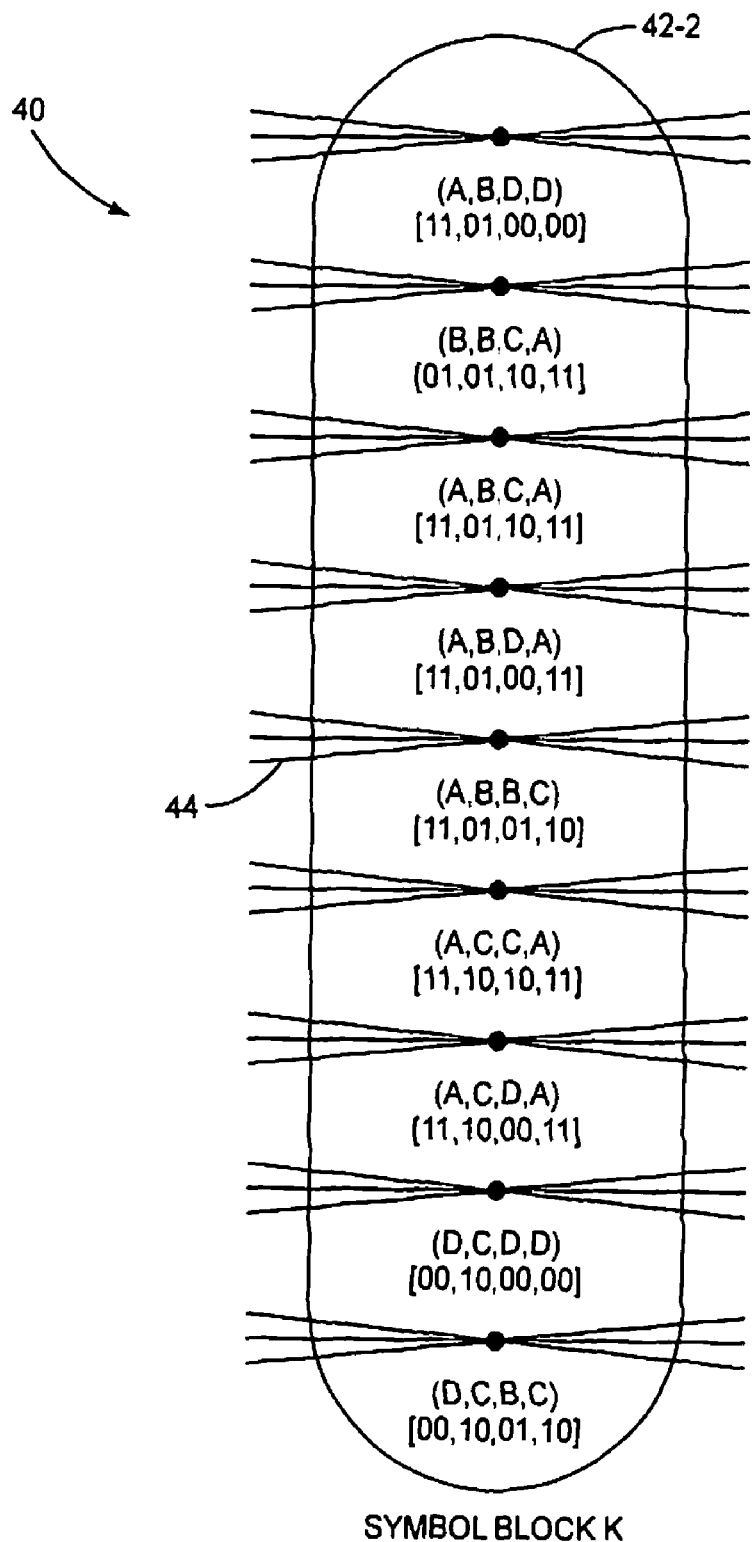
FIG. 4C is a diagram of example state spaces in a trellis for reduced complexity symbol block detection as taught according to one embodiment of the present invention.

As the detector 26 limits the candidate combinations of symbols considered for symbol block k to this final reduced set 25, FIG. 4C illustrates the corresponding state space 42-2 for symbol block k. Still reduced as compared to the defined set 32 of candidate symbol combinations, the detector 26 considers fewer possible sequences of symbol blocks and thereby attains reduced computational complexity. Moreover, that computational complexity is stable across the detection of the symbol block sequence because the size of the final reduced set 25 (and thereby the size of the state space 42-2) complies with a pre-determined size of $S_F=9$. Still further, the detector 26 may calculate soft bit values for each bit value $b_1,b_2,b_3,b_4,b_5,b_6,b_7,b_8$ in the detected candidate symbol combination because the state space 42-2 includes complementary bit values $\bar{b}_1,\bar{b}_2,\bar{b}_3,\bar{b}_4,\bar{b}_5,\bar{b}_6,\bar{b}_7,\bar{b}_8$ for each of those bit values.

Of course, although the "optimal" approach just described guarantees soft bit value generation for each bit value, the approach requires, in the worst case, that the size of the subset(s) formed at each stage be at least $N_b+1$, where $N_b$ is the number of bits in the candidate symbol combination considered at that stage (e.g., the size of the subset 36-1,2 had to be at least five so it could include the most likely candidate symbol combination and four other candidate symbol combinations that each only had a complementary bit value for one bit value in the most likely combination). Because $N_b$ increases with the modulation order and the number of symbols in a symbol block, this embodiment may unacceptably increase the computational complexity of each assisting stage, as well as that of the detector 26.

In some embodiments, therefore, an assisting detector 22, 24 is configured to form a subset of candidate symbol combinations by selecting them from the set based not only on their likelihood, but also based on whether and to what extent they have complementary bit values for other respective bit values in the most likely candidate symbol combination. By giving additional weight to those candidate symbol combinations in the set that have complementary bit values for multiple respective bit values, the pre-determined size of the subset may be decreased while achieving a high probability that the subset will include complementary bit values for many of the bit values in the most likely candidate symbol combination. For any bit values in the most likely candidate symbol combination that do not have complementary bit values in the subset, the detector 26 may generate soft bit values 88 using other known approaches, e.g., by performing a first and second joint detection process as described in the parent application hereto, U.S. patent application Ser. No. 12/568, 036.

Consider, for instance, the formation of the subset 36-1,2 in FIG. 4A. Each of the candidate symbol combinations (B,B), (B,A), (B,C), (D,C), (D,A), and (D,B) in the set 35-1,2 have complementary bit values for the first bit value in the most likely combination, (A,B). Moreover, each has complementary bit values for 0, 1, 2, 3, 2, and 1 other respective bit values in (A,B), respectively. Accordingly, in this embodiment, the second assisting detector 22 may select (B,A) as the first to include in the subset 36-1,2, instead of (B,B), because, although it is less likely than (B,B), it has a complementary bit value for one other respective bit value in (A,B). Based on the assumption that the second assisting detector 22 will capture complementary bit values for at least two respective bit values in (A,B) with only a single candidate symbol combination, such as (B,A), the pre-determined size $S_2$ of the subset 36-1,2 may be decreased, e.g., to 3 or 4.

In other embodiments, an assisting detector 22, 24 may be configured to form a subset of candidate symbol combinations by limiting the candidate symbol combinations that are selected based on their having a complementary bit value to those that have a complementary bit value for one or more particular respective bit values (e.g., the least significant bit values) in the most likely candidate symbol combination. By only guaranteeing complementary bit values for some of the bit values in the most likely candidate symbol combination, the pre-determined size of the subset may be decreased. As with the previous embodiment, the detector 26 may generate soft bit values 88 using other known approaches for any bit values in the most likely candidate symbol combination (e.g., the most significant bit values) that do not have complementary bit values in the subset.

In each embodiment described thus far, an assisting detector 22, 24 has been configured to arrange the entire set from which it selects a subset (e.g., the second assisting detector 22 in FIG. 4A had to arrange the entire set 35-1,2 in order of likelihood so that it could select the subset 36-1,2). Because the assisting detector 22, 24 considers all arranged candidate symbol combinations in the set when selecting the subset, such increases the computational complexity of each stage, especially for detection of symbol blocks that include the combination of a large number of symbols. In alternative embodiments, therefore, the assisting detector 22, 24 is configured to arrange only a portion of the candidate symbol combinations in the set.

Figure 5A:
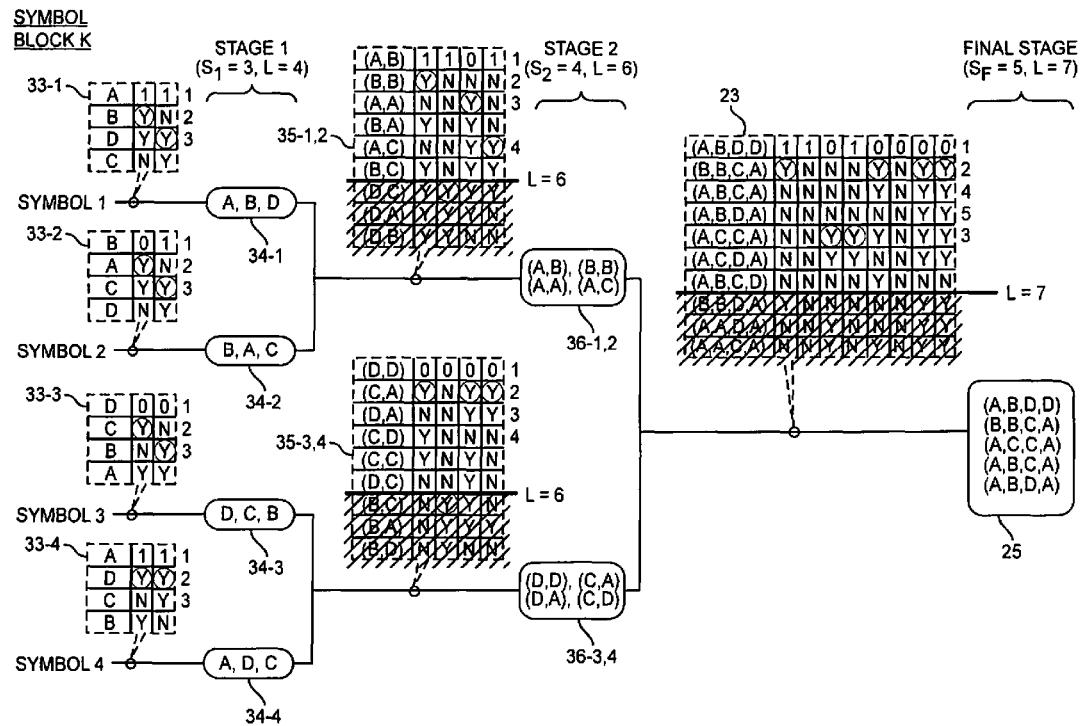
FIG. 5A is a diagram illustrating symbol block detection and soft bit value generation for an example symbol block according to another embodiment of the present invention.

FIG. 5A illustrates one such embodiment by reference to a modified version of the example from FIGS. 4A-4C. In FIG. 5A, the second assisting detector 22 performing the second stage of detection assistance is configured to arrange only a portion of the set 35-1,2 in order of likelihood; specifically, to arrange the L most likely candidate symbol combinations in the set 35-1,2 in order of likelihood, where L is less than the size of the set 35-1,2 and is equal to six for the second stage in this example. The second assisting detector 22 then progresses through the L=6 arranged candidate symbol combinations in decreasing order of likelihood in much the same way as described above with reference to FIG. 4B, but without considering the non-arranged combinations (those crossed out below the line L=6 in FIG. 5A). By only arranging and considering the L=6 most likely candidate symbol combinations in the set 35-1,2, the computational complexity of the second assisting detector 22 is reduced.

As a tradeoff, however, the resulting subset 36-1,2 does not include complementary bit values for all respective bit values of the most likely candidate symbol combination; namely, for the second bit value in (A,B). In particular, (D,C) is the most likely candidate symbol combination in the set 35-1,2 that has a complementary bit value for the second bit value in (A,B), but the second assisting detector 22 never considers (D,C) for inclusion in the subset 36-1,2 because it is the seventh most likely candidate symbol combination in the set 35-1,2. The second assisting detector 22 is configured to do the same for forming the subset 36-3,4 from the set 34-3,4, and therefore the subset 36-3,4 also does not include a complementary bit value for the second bit value in (D,D). Accordingly, the final reduced set 25 formed by the final assisting detector 24 does not include complementary bit values for the second or sixth bit values in (A,B,D,D).

As the detector 26 limits the candidate combinations of symbols considered for symbol block k to this final reduced set 25, FIG. 5B illustrates the corresponding state space 42-2 for symbol block k. The state space 42-2 notably contains fewer candidate symbol combinations than the state space in the example of FIG. 4C, and was also attained with reduced computational complexity as compared to that of FIG. 4C. However, because the state space 42-2 in FIG. 5B does not include complementary bit values for the second or sixth bit values in (A,B,D,D), the detector 26 must generate soft bit values 88 for these bit values using other known approaches.

It should be noted that the assisting detectors 22, 24 in this embodiment may also be configured to base the selection of candidate symbol combinations on whether and to what extent they have complementary bit values for other respective bit values in the most likely candidate symbol combination, as described above with respect to FIGS. 4A-4C. Furthermore, the assisting detectors 22, 24 may also be configured to limit the candidate symbol combinations that are selected based on their having a complementary bit value to those that have a complementary bit value for one or more particular respective bit values (e.g., the least significant bit values) in the most likely candidate symbol combination.

Those skilled in the art, therefore, will readily appreciate that the above embodiments represent non-limiting examples of the demodulator 10 and that other variations and modifications may be made thereto without changing the resulting subsets formed. For example, the above embodiments describe the demodulator 10 as being configured to first perform one or more sorting operations on a set to arrange at least a portion of the candidate symbol combinations in the set in order of likelihood, and then to progress through the arranged combinations in decreasing order of likelihood to select combinations for inclusion in a subset based on whether they have complementary bit values for a respective bit value in the most likely combination. Those skilled in the art will understand, however, that the demodulator 10 may instead be configured to first determine the candidate symbol combinations in the set that have a complementary bit value for a particular bit value in the most likely combination, and then to perform a sorting operation on only those candidate symbol combinations to identify and select for inclusion in the subset the most likely one (if not already selected with respect to another bit value). This may be performed for each bit value in the most likely candidate symbol combination. Another sorting operation may then be performed on at least the remaining candidate symbol combinations to determine and select for inclusion in the subset as many of the most likely remaining combinations as are needed for the size of the subset to conform to the pre-determined size.

Those skilled in the art will also appreciate that the selection of the additional candidate symbol combinations needed for the size of the subset to conform to the pre-determined size may be based on criteria other than or in addition to the likelihood of those combinations. In one embodiment, for example, that selection is based on whether each candidate symbol combination has a complementary bit value for a respective bit value in the most likely candidate symbol combination, and how many candidate symbol combinations already selected also have such a complementary bit value.

Consider, for instance, the final assisting detector's formation of the final reduced set 25 back in the example of FIG. 4A. In this case, the final assisting detector 24 first selects from the reduced set 23 the combination (A,B,D,D), as the most likely, then (B,B,C,A), (A,B,B,C), (A,C,C,A), and (D,C,D,D) which are the most likely in the reduced set 23 that have complementary bit values for the respective bit values in (A,B,D,D). In this embodiment, however, the final assisting detector 24 does not simply select (A,B,C,A) as the sixth combination to include in the final reduced set 25 because it is the next most likely combination not yet selected. Indeed, although (A,B,C,A) has complementary bit values for the fifth, seventh, and eighth bit values, two other combinations already selected have a complementary bit value for the fifth bit value, three other combinations already selected have complementary bit values for the seventh bit value, and two other combinations already have complementary bit values for the eighth bit value. On the other hand, although (D,C,B,C) is less likely than other combinations not yet selected, it has complementary bit values for the second and sixth bit values in (A,B,D,D) and only one other combination already selected has a complementary bit value for each of those bit values. Accordingly, the final assisting detector 24 selects (D,C,B,C) as the sixth combination to include in the final reduced set 25 instead of (A,B,C,A).

Those skilled in the art will further appreciate that while the assisting detectors 22, 24 have formed a subset in the above embodiments by first selecting the single most likely candidate symbol combination in the set, the assisting detectors 22, 24 may also form a subset by selecting a plurality of the most likely candidate symbol combinations in the set. In this case, an assisting detector 22, 24 first selects the P most likely candidate symbol combinations in the set (P≧2), and then selects additional candidate symbol combinations based on whether they have complementary bit values with respect to the single most likely candidate symbol combination. In doing so, this embodiment favors including more likely candidate symbol combinations in the subset than necessarily including candidate symbol combinations for soft bit value generation, but nonetheless facilitates soft bit value generation.

Furthermore, although the one or more assisting detectors 22 in the above embodiments have been configured to form a subset of candidate symbol combinations for each of one or more groups of symbols 18 in a symbol block 14, the assisting detectors 22 may instead be configured to form a subset of candidate symbol values for each of one or more individual symbols 18 in a symbol block 14. The assisting detectors 22 may make this selection in the same manner as that described above, but with respect to candidate symbol values instead of candidate symbol combinations. Moreover, the assisting detector performing the single stage of detection assistance in co-owned U.S. patent application Ser. No. 12/035,932, which describes AMLD with Single-Stage Assistance (SSA), may also form a subset of candidate symbol values in this manner.

With regard to the AMLD with MSA example of FIG. 4A, however, the first assisting detector 22 performs the first stage of detection assistance by detecting each of four individual symbols within the symbol block k. In particular, the first assisting detector 22 forms from a defined set 33 of candidate symbol values a subset 34 of $S_1=3$ candidate symbol values for each symbol. To form the subset 34-1 for symbol 1, for example, the first assisting detector 22 first selects 'A' as the most likely candidate symbol value in the defined set 33-1, then selects 'B' as the most likely in the defined set 33-1 that has a complementary bit value for the first bit value in 'A,' and finally selects 'C' as the most likely in the defined set 33-1 that has a complementary bit value for the second bit value in 'A. Because the subset 34-1 conforms to the pre-determined size $S_1=3$ at this point, no more candidate symbol values are selected. To form the reduced set 34-4 for symbol 1, however, the first assisting detector 22 first selects 'A' as the most likely in the defined set 33-4, then selects 'D' as the most likely in the defined set 33-4 that has a complementary bit value for both the first and second bit values in 'A,' and finally selects 'C' as the next most likely not yet selected in order for the size of the subset 34-4 to conform to the pre-determined size $S_1=3$.

The soft bit values 88 generated by the demodulator 10 as taught herein can be particularly beneficial for received signal processing in wireless communication contexts, although the invention is not limited to such applications. While described for a CDMA system, in which a time sequence of symbol blocks are detected, the invention applies to sequences in code, subcarriers, and space. It also applies to combinations of different types of sequences. Thus, in general, the invention applies to a plurality of symbol blocks. For example, in the downlink of the LTE system, MIMO is used. While there may be no ISI between different blocks of symbols in time, there is ISI in space, between symbols sent from different transmit antennas or beams. With 4×4 MIMO, for example, there is ISI within groups of 4 symbols. In this case, the first detection assistance stage may detect each of four individual symbols, and the final detection assistance stage may jointly detect each of two groups of two symbols each. The detector 26 may then jointly detect a group of all four symbols.

Regardless, determining processing weights for joint detection of symbol subsets is well understood; See, for example, V. Tarokh, A. Naguib, N. Seshadri and A. R. Calderbank, "Combined array processing and space-time coding," IEEE Trans. Info. Theory, vol. 45, no. 4, pp. 1121-1128, May 1999. Note that in the final stage of detection assistance, the forming of the one or more groups of symbols for joint detection may not be random. It would be advantageous, for instance, to pair symbols that interfere more with one another. This can be determined using a channel matrix as described in X. Li, H. C. Huang, A. Lozano, and G. J. Foschini, "Reduced-complexity detection algorithms for systems using multi-element arrays," in Proc. IEEE Globecom, San Francisco, Nov. 17-Dec. 1, 2000, pp. 1072-1076.

Another example is the LTE uplink, in which a single-carrier approach is used. The approach effectively transmits symbols one at a time sequentially in time. In this case, a symbol block may be defined as 4 sequential symbols (.e.g, symbols 1, 2, 3, 4 is one block, symbols 5, 6, 7 and 8 is another block, and so on). Formation of combining weights for a BDFE in this case is described in D. Williamson, R. A. Kennedy, and G. W. Pulford, "Block decision feedback equalization," IEEE Trans. Commun., vol. 40, no. 2, pp. 255-264, February 1992.

In general, therefore, a symbol block as used herein may include the combination of two or more symbols sent in parallel using different orthogonal codes, two or more symbols sent from different antennas, or two or more symbols transmitted in a time interval of interest.

Figure 6:
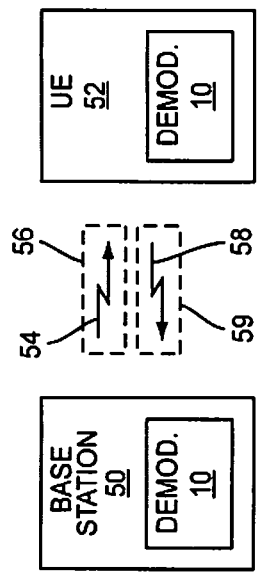
FIG. 6 is a block diagram of a wireless communication network base station and corresponding user equipment, either or both of which may be configured with demodulation circuits for soft bit value generation according to the teachings herein.

In view of the above described variations, FIG. 6 thus illustrates a base station 50 for use in a wireless communication network, for supporting wireless communications with a user equipment (UE) 52. The base station 50 comprises, for example, a WCDMA or other type of base station, and the UE 52 comprises a cellular radiotelephone, pager, network access card, computer, PDA, or other type of wireless communication device.

In one embodiment, the UE 52 includes an embodiment of the demodulator 10 as taught herein, for processing downlink signals 54 transmitted by the base station 50 over a time-dispersive channel 56. Additionally or alternatively, the base station 50 includes an embodiment of the demodulator 10 as taught herein, for processing uplink signals 58 transmitted by the UE over a time-dispersive channel 59, which may or may not be the same as the channel 56.

Figure 7:
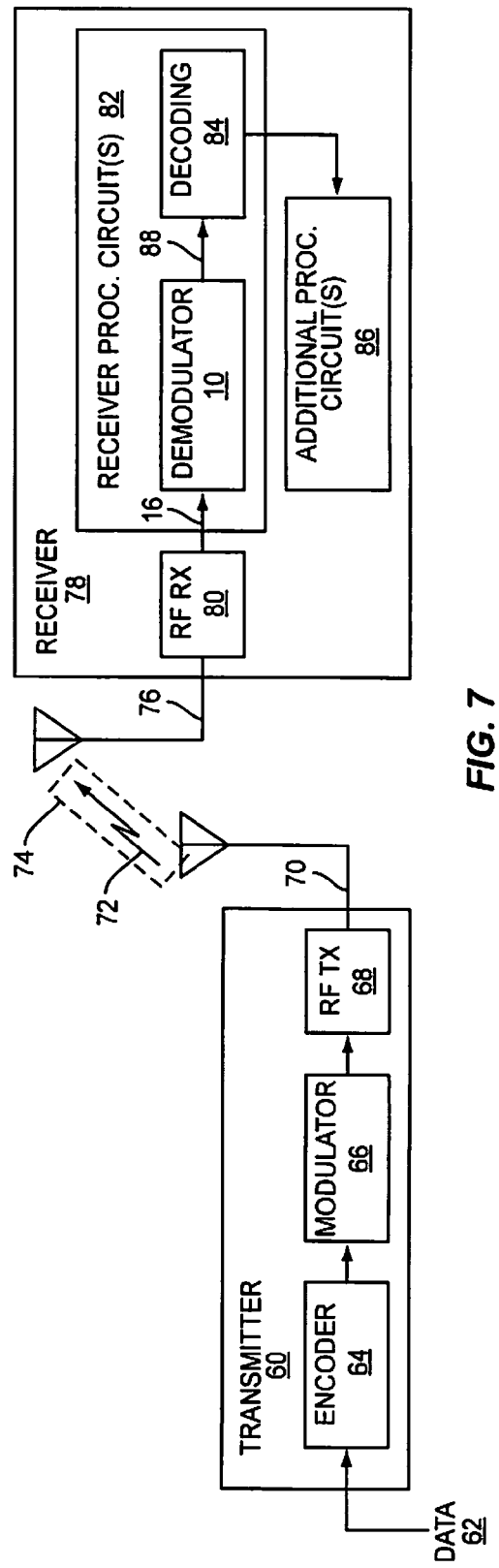
FIG. 7 is a block diagram of one embodiment of a transmitter and receiver, where the receiver is configured with demodulation circuits for soft bit value generation according to the teachings herein.

FIG. 7 provides a more detailed but non-limiting transmitter/receiver example. At a transmitter 60, information symbols 62 are optionally encoded using a forward-error-correction (FEC) encoder 64, such as a convolutional encoder or turbo-code encoder. The resulting modem bits are provided to a modulator 66, where modem symbols are formed (e.g. QPSK, 16-QAM) and used to modulate waveforms such as spreading waveforms or OFDM subcarriers. The modem symbols can be pre-coded via a Discrete Fourier Transform before being modulated on OFDM subcarriers, like the case in the uplink of LTE. The resulting signal is then modulated onto a radio carrier in RF transmit circuits 68, and transmitted on one or more transmit antennas 70. The transmitted signal 72 passes through a transmission medium 74, such as a multipath fading channel, and arrives at one or more receive antennas 76 at a receiver 78. The received signals are processed by a front-end RF circuit 80, which mixes them down to baseband and digitizes them to form a baseband signal that, in this embodiment, represents the earlier identified received signal 16. The received signal values comprising the received signal 16 thus represent or otherwise convey a given sequence 12 of symbol blocks 14.

Receiver processing circuits 82 include an embodiment of the demodulator 10, which may be configured to process the received signal 16. In particular, the demodulator 10 includes one or more assisting detectors 22, a final assisting detector 24, and a detector 26 which are configured as described above to generate soft bit values 88 for the symbols 18 in the sequence 12 of symbol blocks 14. The soft bit values 88 are output by the demodulator 10 and input to a decoding circuit 84. The decoding circuit 84 decodes the detected symbols 18 based on the provided soft bit values 88 to recover the originally transmitted information. The decoding circuit 84 outputs such information to one or more additional processing circuits 86, for further operations. The nature of the additional processing circuits varies with the intended function or purpose of the receiver 78, e.g., base station circuit, mobile terminal circuit, etc., and it should be understood more generally that the illustrated architecture of the receiver 78 is non-limiting.

Likewise, all of the foregoing description and the accompanying drawings represent non-limiting examples of the methods and individual apparatuses taught herein. As such, the present invention is not limited by the foregoing description and accompanying drawings. Instead, the present invention is limited only by the following claims and their legal equivalents.

What is claimed is:

1. A method implemented by a demodulator for generating soft bit values for a plurality of symbol blocks, each symbol block being a combination of two or more symbols, comprising the steps of:

forming a subset of candidate symbol combinations, for each of one or more groups of symbols in a symbol block, by selecting from a set of candidate symbol combinations for the each of one or more groups of symbols in the symbol block, the following of:

a most likely candidate symbol combination in said set;

at least one candidate symbol combination which is a next most likely in said set that has a complementary bit value for a respective bit value in the most likely candidate symbol combination; and a plurality of additional next most likely candidate symbol combinations from said set of candidate symbol combinations not yet selected, the selection based on a highest to lowest likelihood of the candidate symbol combinations in the set, wherein the plurality of additional next most likely candidate symbol combinations are needed for inclusion for a size of the subset to conform to a pre-determined size; and generating soft bit values for the plurality of symbol blocks based on a joint detection process that limits the candidate symbol combinations of symbols considered for the corresponding symbol block according to the subset formed for the each of one or more groups of symbols in the symbol block.

2. The method of claim 1, wherein forming a subset of candidate symbol combinations for the each of one or more groups of symbols comprises the steps of:

jointly detecting the symbols in the each of one or more groups of symbols in a symbol block to obtain joint metrics for the candidate symbol combinations in said set;

performing one or more sorting operations on said set as a function of the joint metrics obtained; and selecting the candidate symbol combinations from said set responsive to said one or more sorting operations.

3. The method of claim 1, wherein forming a subset of candidate symbol combinations for the each of one or more groups of symbols in a symbol block comprises the step of performing one or more sorting operations on said set to arrange at least a portion of the candidate symbol combinations in said set in order of said likelihood.

4. The method of claim 3, wherein forming a subset of candidate symbol combinations for the each of one or more groups of symbols in a symbol block further comprises the step of progressing through the arranged candidate symbol combinations in decreasing order of said likelihood, selecting a candidate symbol combination for inclusion in the subset if:

the candidate symbol combination is the most likely arranged candidate symbol combination; or the candidate symbol combination has a complementary bit value for a respective bit value in the next most likely arranged candidate symbol combination and no other candidate symbol combination selected has such a complementary bit value.

5. The method of claim 4, wherein forming a subset of candidate symbol combinations for the each of one or more groups of symbols further comprises the step of selecting for inclusion in the subset the plurality of additional next most likely symbol combinations from remaining arranged candidate symbol combinations needed for the size of the subset to conform to the pre-determined size.

6. The method of claim 1, wherein forming a subset of candidate symbol combinations for the each of one or more groups of symbols comprises:

performing a sorting operation on said set of candidate symbol combinations to identify and select for inclusion in the subset the most likely candidate symbol combination in said set;

for each bit value in the most likely candidate symbol combination, determining candidate symbol combinations in said set that have a complementary bit value and performing a sorting operation on said determined candidate symbol combinations to identify and select for inclusion in the subset the next most likely one, if not yet selected with respect to another bit value in the most likely candidate symbol combination.

7. The method of claim 6, wherein forming a subset of candidate symbol combinations for the each of one or more groups of symbols further comprises the steps of:

performing a sorting operation on at least remaining candidate symbol combinations not yet selected for inclusion in the subset; and selecting for inclusion in the subset the plurality of additional next most likely candidate symbol combinations, the selection based on the highest to lowest likelihood of the candidate symbol combinations in the set and a number of the plurality of additional next most likely candidate symbol combinations needed for the size of the subset to conform to the pre-determined size.

8. The method of claim 1, wherein forming a subset of candidate symbol combinations for the each of one or more groups of symbols comprises selecting among the next most likely candidate symbol combinations not yet selected based on:

the likelihood of each next most likely candidate symbol combination; and whether each candidate symbol combination has a complementary bit value for a respective bit value in the most likely candidate symbol combination, and determining a number of candidate symbol combinations selected that have such a complementary bit value.

9. The method of claim 1, wherein forming a subset of candidate symbol combinations for the each of one or more groups of symbols comprises selecting among candidate symbol combinations in said set that each have a complementary bit value for the same respective bit value in the most likely candidate symbol combination based on the likelihood of each candidate symbol combination.

10. A demodulator configured to generate soft bit values for a plurality of symbol blocks, each symbol block being a combination of two or more symbols, comprising:

one or more assisting detectors and a final assisting detector, at least one of which is configured to form a subset of candidate symbol combinations, for each of one or more groups of symbols in a symbol block, by selecting from a set of candidate symbol combinations for the each of one or more groups of symbols in the symbol block:

a most likely candidate symbol combination in said set;

at least one candidate symbol combination which is a next most likely in said set that has a complementary bit value for a respective bit value in the most likely candidate symbol combination; and a plurality of additional next most likely candidate symbol combinations from said set of candidate symbol combinations not yet selected, the selection based on a highest to lowest likelihood of the candidate symbol combinations in the set, wherein the plurality of additional next most likely candidate symbol combinations are needed for inclusion for a size of the subset to conform to a pre-determined size; and a detector configured to generate soft bit values for the plurality of symbol blocks based on a joint detection process that limits the candidate symbol combinations of symbols considered for the corresponding symbol block according to the subset formed for the each of one or more groups of symbols in the symbol block.

11. The demodulator of claim 10, wherein the at least one of the one or more assisting detectors and the final assisting detector is configured to form a subset of candidate symbol combinations for the each of one or more groups of symbols by:

jointly detecting the symbols in the each of one or more groups of symbols in a symbol block to obtain joint metrics for the candidate symbol combinations in said set;

performing one or more sorting operations on said set as a function of the joint metrics obtained; and selecting the candidate symbol combinations from said set responsive to said one or more sorting operations.

12. The demodulator of claim 10, wherein the at least one of the one or more assisting detectors and the final assisting detector is configured to form a subset of candidate symbol combinations for the each of one or more groups of symbols by performing one or more sorting operations on said set to arrange at least a portion of the candidate symbol combinations in said set in order of said likelihood.

13. The demodulator of claim 12, wherein the at least one of the one or more assisting detectors and the final assisting detector is further configured to form a subset of candidate symbol combinations for the each of one or more groups of symbols by progressing through the arranged candidate symbol combinations in decreasing order of said likelihood, selecting a candidate symbol combination for inclusion in the subset if:

the candidate symbol combination is the most likely arranged candidate symbol combination; or the candidate symbol combination has a complementary bit value for a respective bit value in the next most likely arranged candidate symbol combination and no other candidate symbol combination selected has such a complementary bit value.

14. The demodulator of claim 13, wherein the at least one of the one or more assisting detectors and the final assisting detector is further configured to form a subset of candidate symbol combinations for the each of one or more groups of symbols by selecting for inclusion in the subset the plurality of additional next most likely symbol combinations from remaining arranged candidate symbol combinations needed for the size of the subset to conform to the pre-determined size.

15. The demodulator of claim 10, wherein the at least one of the one or more assisting detectors and the final assisting detector is configured to form a subset of candidate symbol combinations for the each of one or more groups of symbols by:

performing a sorting operation on said set of candidate symbol combinations to identify and select for inclusion in the subset the most likely candidate symbol combination in said set;

for each bit value in the most likely candidate symbol combination, determining candidate symbol combinations in said set that have a complementary bit value and performing a sorting operation on said determined candidate symbol combinations to identify and select for inclusion in the subset the next most likely one, if not yet selected with respect to another bit value in the most likely candidate symbol combination.

16. The demodulator of claim 15, wherein the at least one of the one or more assisting detectors and the final assisting detector is further configured to form a subset of candidate symbol combinations for the each of one or more groups of symbols by:

performing a sorting operation on at least remaining candidate symbol combinations not yet selected for inclusion in the subset; and selecting for inclusion in the subset the plurality of additional next most likely candidate symbol combinations, the selection based on the highest to lowest likelihood of the candidate symbol combinations in the set and a number of the plurality of additional next most likely candidate symbol combinations needed for the size of the subset to conform to the pre-determined size.

17. The demodulator of claim 10, wherein the at least one of the one or more assisting detectors and the final assisting detector is configured to form a subset of candidate symbol combinations for the each of one or more groups of symbols by selecting among the next most likely candidate symbol combinations not yet selected based on:

the likelihood of each next most likely candidate symbol combination; and whether each candidate symbol combination has a complementary bit value for a respective bit value in the most likely candidate symbol combination, and determining a number of candidate symbol combinations selected that have such a complementary bit value.

18. The demodulator of claim 10, wherein the at least one of the one or more assisting detectors and the final assisting detector is configured to form a subset of candidate symbol combinations for the each of one or more groups of symbols by selecting among candidate symbol combinations in said set that each have a complementary bit value for the same respective bit value in the most likely candidate symbol combination based on the likelihood of each candidate symbol combination.

* * * * *